3,378,376
EGG WHITE COMPOSITION, METHOD OF
PREPARING AND PROCESS UTILIZING
SAME
Michael Sebring, Westmont, Ill., assignor to Armour and
Company, Chicago, Ill., a corporation of Delaware
No Drawing. Filed July 1, 1964, Ser. No. 379,707
12 Claims. (Cl. 99—92)

ABSTRACT OF THE DISCLOSURE

This invention relates to the use of guar gum to reduce the whipping time of egg white and improve the physical properties and characteristics of egg white and baked products made therefrom.

Background of the invention

The present invention relates to an egg white composition having improved characteristics and to processes for producing such compositions. More particularly, the invention relates to egg white compositions having improved whipping properties, foam stability and usefulness in making products such as cakes, meringues, icings, etc., and to processes for producing such compositions and products having these desirable properties.

The usual practice for treating egg white has been through the addition of various chemical additives. Some of these chemical additives which have been used are polyhydric alcohols having less than 4 carbon atoms and aliphatic monobasic acids having two or three carbon atoms. The anionic detergent sodium lauryl sulphate (SLS) has been suggested for use in dried egg whites as an agent to improve whipping properties. Triethyl citrate (TEC) has been suggested for use as an additive to egg white to improve cake volume and whipping time. All of the above additives to natural egg white, and all other known additives are believed to be deficient in their ability to impart one or more of the following improvements: reduction of the whipping time of the natural egg white, improvement of the egg white foam body and stability, and the improvements in apparent moistness, structure and texture of one or more of the meringues, icings and baked goods produced through the use of egg white compositions. Consequently, there is an ever continuing search for new egg white compositions.

A primary object of the present invention is to produce new egg white compositions having far superior whipping time as compared to natural, plain egg white, that is, egg white without additive.

Another object of this invention is to produce a superior egg white product which exhibits improved whipping properties and foam body and stability when made from natural or reconstituted dry egg white.

A further object of this invention is to produce a new and versatile egg white composition that can be used advantageously in the liquid, dry or frozen form in a broad range of products.

Another object of this invention is to produce an improved egg white composition suitable for incorporation in a dry cake mix. Other objects and advantages will become apparent as this specification proceeds.

I have discovered that through the addition of a minor amount of guar gum to egg white, superior whipping characteristics can be obtained. By the addition of guar gum, the whipping time is substantially reduced and the guar gum imparts improved body and stability to the foam. It is also possible to spray dry the mixture. I have also found that liquid egg white can be spray dried and a minor amount of powdered guar can be dry blended with the spray dried egg white for subsequent reconstitution and whipping. A minor amount of guar gum may also be added to natural egg before freezing or after thawing.

It is well-known that there are seven natural gums, namely, arabic, tragacanth, karaya, guar, locust bean, Irish moss and agar which offer a wide variety of flexibility to function as stabilizers and bodying agents for foods. Literature describing the chemical composition and physical properties and characteristics of the natural gums include: "The Water Soluble Gums," by C. L. Mantell, Ph. D., Reinhold Publishing Corporation (1947); "Industrial Gums," by R. L. Whistler and J. N. Be Miller; and "Stabilizers, Bodying Agents for Improved Low-Calorie Foods," by George Meer, Jr. which appeared in Food Processing, May 1963. However, I am not aware of anything in the prior art which would suggest the use of guar gum in natural egg white to reduce the whipping time of the egg white.

I do not know why the addition of a trace or more of guar gum to egg white improves the functional properties of the egg white product. We do know that the origin of guar gum is biological; it is an edible colloid; and it is a galactomannan containing galactose and mannose. Dr. Mantell, in his textbook mentioned above, reports that guar gum is a mannose polymer with single galactose branches on alternate mannose units. It is this structure that distinguished it from all of the other gums.

Liquid natural egg white generally contains about 12% solids, however, the solid content may vary through a range of from about 11.8% to about 12.2%. Liquid egg white may be obtained by cracking eggs and separating the natural egg white from the yolks, or it may be purchased commercially from concerns that separate the egg white and pack it in cans.

In the practice of my invention, eggs are cracked and the liquid natural egg white is separated from the yolks. A minor amount of powdered guar gum is then mixed with the natural egg white. The amount of guar gum added may vary from a trace (up to 0.02% by weight) to about 0.7% by weight preferably about 0.1% by weight. Larger amounts of guar gum may also be used especially when the egg white mixture is diluted with water. When preparing commercial quantities of liquid natural egg white in hundreds or thousands of pounds, I prefer to mix the guar gum with 5% water by weight to form a slurry which speeds the mixing and dispersion of the guar gum throughout the larger batches of liquid egg white.

In the usual commercial practice of preparing angel cakes, wherein large quantities of standard fast whipping egg solids containing such conventional additives as SLS or TEC are called for, the use of ice is required to reduce the batter temperature in order to increase the viscosity of the thin liquid to prevent excessive loss from splashing during reconstitution, mixing and whipping. The addition of ice is also necessary to prevent the formation of coarse open-cell texture in cakes and other finished products which normally results at higher batter temperatures when ice is not used. In the practice of my invention, egg white solids containing guar gum are used instead of the usual solids which contain SLS or TEC. The use of solid egg white containing guar gum has the surprising advantages of being splash-free during mixing and whipping without the use of ice, producing an improved fine textured cake, notwithstanding the higher batter temperature, eliminating the step of adding ice as well as obviating the necessity for expensive ice making machinery.

Liquid natural egg white may be solidified by any suitable means, such as spray drying, and a minor amount of powdered guar gum ranging from a trace to 10% or more by weight can be dry blended into the solid egg white material. When guar gum and solid egg white are dry blended, I prefer to use about 1.0% guar gum by weight to obtain an optimum or balance between the reduction of whip time, the increased foam stability and the aforementioned improvements in the finished products. If guar gum and egg white are co-dried, I prefer to use about 0.8% guar gum by weight to attain an optimum result, however, amounts of guar gum ranging from a trace to 10% by weight does not impair the superior performance of my composition. The characteristics of guar gum enabling it to function in dry, frozen, natural liquid and dilute egg white combined with its applicability to a broad range of products makes my versatile egg white composition desirable for many uses, such as, in dry mixes for meringues, icings, baked goods, etc., and for use in commercial establishments as well as in the home.

The following examples illustrate the practice of my invention and demonstrates the effect of various concentrations of guar gum in frozen, liquid and dried egg white upon whipping time, foam stability and product and method improvement.

Example I

The effect of various levels of guar gum in the production of liquid egg white meringue was determined. Various amounts of powdered guar gum, commencing with 0.02% by weight were mixed with sixty-three (63) ml. of liquid natural egg white. Sugar was added during whipping. Ten seconds after whipping began, the addition of forty-four (44) grams of sugar was commenced. The addition of sugar was completed upon reaching twenty (20) seconds of total whipping time. Whipping continued and the specific gravity of the foam was measured at total whipping time intervals of thirty (30) seconds and sixty (60) seconds. Foam specific gravities were determined by measuring the volumes of foam, weighing them and dividing them by the weight of an equal volume of water. Tabulations of data obtained in this manner are portrayed in the following table.

TABLE 1.—THE EFFECT OF VARIOUS LEVELS OF GUAR GUM ON LIQUID EGG WHITE MERINGUE

| Sample No. | Sample Egg White Description | Specific Gravity | |
|---|---|---|---|
| | | 30 Sec. | 60 Sec. |
| 1 | Raw Control (plain) | 0.202 | 0.189 |
| 2 | 0.02% by wt. guar gum added | 0.180 | 0.180 |
| 3 | 0.03% by wt. guar gum added | 0.180 | 0.176 |
| 4 | 0.05% by wt. guar gum added | 0.192 | 0.170 |
| 5 | 0.07% by wt. guar gum added | 0.175 | 0.169 |
| 6 | 0.08% by wt. guar gum added | 0.175 | 0.161 |
| 7 | 0.09% by wt. guar gum added | 0.174 | 0.159 |
| 8 | 0.10% by wt. guar gum added | 0.170 | 0.155 |
| 9 | 0.20% by wt. guar gum added | 0.3 | 0.155 |
| 10 | 0.30% by wt. guar gum added | 0.3 | 0.151 |
| 11 | 0.50% by wt. guar gum added | 0.4 | 0.400 |
| 12 | 0.70% by wt. guar gum added | 0.4 | 0.400 |

The data in Table 1 amply demonstrate the immediate effect of the addition of a trace or minor amount of guar gum to egg white upon the reduction of whipping time as indicated by the lower specific gravities. Table 1 particularly illustrates the broad range of amounts of guar gum that may be added to liquid natural egg white to substantially reduce the whipping time.

Example II

Three two-pound samples of egg white containing no additive, 0.025% TEC, and 0.1% guar gum respectively, were prepared by mixing into each sample 1 pound of sugar and ½ ounce of cream of tartar. These were subsequently whipped to obtain the following information shown in Table 2 below.

TABLE 2.—SPECIFIC GRAVITY AS A FUNCTION OF WHIPPING TIME AND ADDITIVE

| Whip Time, minutes | Specific Gravity | | |
|---|---|---|---|
| | Plain | 0.025% TEC | 0.1% Guar |
| 2 | 0.314 | 0.174 | 0.158 |
| 3 | 0.274 | 0.155 | 0.149 |
| 4 | 0.233 | 0.144 | 0.138 |
| 6 | 0.198 | 0.136 | 0.123 |
| 8 | 0.156 | 0.127 | 0.120 |
| 10 | 0.135 | 0.122 | 0.116 |
| 12 | | 0.113 | 0.108 |

Table 2 above illustrates the immediate reduction of whipping time as indicated by the substantially lower specific gravity of the egg white containing 0.1% powdered guar gum after only 2 minutes of whipping time as compared with samples containing no additive and 0.025% by weight TEC. The specific gravities of the egg white sample containing guar gum consistently exhibited appreciably lower values throughout the entire twelve minute test.

Example III

The effect of water dilution of natural liquid egg white and egg white containing guar gum or whipping time was determined. Ten, sixty-three (63) ml. samples of liquid natural egg white were prepared at 70° F. The addition of water and/or guar gum on a weight percent basis was made in the amounts shown in Table 3 below. The specific gravities were determined in the manner described in Example I above. The samples were whipped by a Model K4B Kitchen Aid Mixer at a speed of 6. The whipping time for the formation of a soft peak was determined and recorded. The soft peak stage appears when withdrawal of the beater from the foam results in the formation of soft, wet, firm peaks in the foam surface. To measure the effect of dilution on egg white, specific gravities were determined after 30 seconds of whipping, and the time in seconds was recorded when the soft peak stage was reached. These data for ten samples containing various levels of natural egg white, water and guar gum are tabulated in Table 3 below.

TABLE 3.—THE EFFECT OF DILUTION ON NATURAL EGG WHITE AND EGG WHITE CONTAINING GUAR GUM (PERCENT BY WEIGHT)

| Sample No. | Percent Egg White | Percent Water | Percent Gum | Specific Gravity, 30 secs. | Whip Time Soft Peak, secs. |
|---|---|---|---|---|---|
| 1 | 100 | 0 | 0.1 | 0.082 | 19 |
| 2 | 100 | 0 | 0.0 | 0.091 | 22 |
| 3 | 90 | 10 | 0.1 | 0.080 | 20 |
| 4 | 90 | 10 | 0.0 | 0.091 | 27 |
| 5 | 50 | 50 | 0.1 | 0.086 | 35 |
| 6 | 50 | 50 | 0.0 | 0.100 | 60 |
| 7 | 10 | 90 | 0.1 | 0.122 | 60 |
| 8 | 10 | 90 | 0.0 | (1) | 150 |
| 9 | 0 | 100 | 0.1 | (1) | (1) |
| 10 | 0 | 100 | 0.0 | (1) | 300 |

[1] Foam failure.

Table 3 exhibits the great flexibility of the guar gum additive to reduce the whipping time of natural egg white over a broad range of dilution as compared to egg white without guar gum.

Example IV

A procedure was devised to obtain data to illustrate foam stability or the ability of egg white foam containing guar gum to withstand its natural tendency to revert to the liquid state. Eighteen 200 gram samples comprising 100 grams of egg white and 100 grams of sugar were prepared. Two sets of six samples each contained 0.025% TEC and 0.1% guar gum respectively with increasing amounts of water. Six control samples containing plain natural egg white with various levels of dilution were prepared. All of these samples were whipped for 30 seconds at a speed of 6 on a Kitchen Aid Model K4B Mixer and the resulting foam was placed in funnels. The drainage was collected for one hour and measured to determine the volume percent lost as tabulated below.

TABLE 4.—THE EFFECT OF GUAR GUM ON EGG WHITE FOAM DECOMPOSITION

| Sample No. | Percent Water Added | Volume of Drainage (Percent) | | |
|---|---|---|---|---|
| | | Plain Control | 0.025% TEC | 0.1% Guar |
| 1 | 0 | 10 | 0.0 | 0.0 |
| 2 | 10 | 35 | 1.0 | 0.0 |
| 3 | 20 | 37 | 1.0 | 0.0 |
| 4 | 30 | 48 | 10.0 | 1.0 |
| 5 | 40 | (¹) | 50.0 | 0.0 |
| 6 | 50 | (¹) | 60.0 | 2.5 |

¹ Foam failure.

Table 4 exhibits the surprising ability of the guar gum additive in natural egg white to consistently withstand foam breakdown. It is through this superior property of egg white containing guar gum that improved meringue stability is imparted to the finished product.

Example V

The effect of egg white containing guar gum in the production of 140% white cake was determined by the following procedure. One pound of cake flour and 8¾ ounces of high ratio shortening were creamed for five minutes at low speed using a commercial Hobart N–50 type mixer. With continued creaming for 3 minutes, 6¼ ounces of granulated sugar, ½ ounce of salt, 1 ounce of baking powder and 7½ ounces of liquid milk were added. Creaming continued for 3 minutes while 12 ounces of various liquid egg white mixtures were added. Eight and one-half ounces of liquid milk were thoroughly mixed at low speed for 6 minutes. The batter was scaled at 13½ ounces into an 8″ x 1½″ round layer tin. The volume of the finished cakes was obtained by the rape seed displacement method.

TABLE 5.—EFFECT OF EGG WHITE CONTAINING GUAR GUM ON 140% WHITE CAKE VOLUME

| Sample No. | Egg White Sample Description | Volume, ml. of cake, 100 g. batter |
|---|---|---|
| 1 | Natural Egg White (Control) | 260 |
| 2 | 0.023% TEC | 268 |
| 3 | 0.1% Guar Gum+5% Water | 278 |
| 4 | 0.023% TEC+5% Water | 248 |
| 5 | 0.1% Guar Gum+10% Water | 274 |

Table 5 illustrates the superior functioning of liquid egg white containing guar gum. Despite 10% water dilution, the egg white containing guar gum consistently produced cakes with higher volumes, improved structure, and soft texture, all of which contribute to the superior eating qualities. Additionally, the egg white containing guar imparted longer shelf life of the finished product.

Example VI

The effect of various levels of dry-blended guar gum and egg white in the production of meringue was determined by measuring the specific gravity of the meringue obtained in the first step in the preparation of a commercial type angle food cake. Nine 4 ounce samples of dried egg white containing various levels of dry-blended powdered guar gum were reconstituted with 28 ounces of water, ½ ounce of salt and ½ ounce of cream of tartar by mixing slowly for 2 minutes. Following the reconstitution period, the mixture was whipped at high speed and 1 pound of sugar was slowly added after 45 seconds of whipping. Whipping was continued until a medium peak formed. Total whipping time was recorded and the specific gravity at medium peak was measured.

TABLE 6.—EFFECT OF VARIOUS LEVELS OF DRY-BLENDED EGG WHITE AND GUAR GUM ON MERINGUE SPECIFIC GRAVITY

| Sample No. | Egg White Sample Description | Whip Time Minutes | Specific Gravity |
|---|---|---|---|
| 1 | Natural (plain) | 2½ | 0.142 |
| 2 | 0.5% Guar | 2 | 0.119 |
| 3 | 1% Guar | 1.5 | 0.128 |
| 4 | 2% Guar | 2 | 0.112 |
| 5 | 3% Guar | 2 | 0.114 |
| 6 | 4% Guar | 2 | 0.114 |
| 7 | 5% Guar | 2 | 0.117 |
| 8 | 7% Guar | 2 | 0.128 |
| 9 | 10% Guar | 2 | 0.146 |

Table 6 data demonstrates the broad range over which egg white containing guar gum is effective in reducing the specific gravity and whipping time required to reach a medium peak.

Example VII

The following test was devised to determine the effect of guar gum on egg white co-dried and subsequently reconstituted for use in the production of angel cakes. In this test guar gum was mixed with liquid natural egg white. The mixture was spray dried and then angel cake batter was prepared from the reconstituted egg white solids containing 0.87% by weight powdered guar gum. The control sample was prepared by the same procedure except that no guar gum was used. Table 7 shows the results of this test.

TABLE 7.—EFFECT OF CO-DRIED GUAR GUM AND EGG WHITE ON WHIP TIME OF ANGEL CAKE PREPARATIONS

| Egg White Description | Whip Time Minutes | Specific Gravity |
|---|---|---|
| Yeast Desugared Egg White (plain) | 6 | 0.186 |
| Yeast Desugared Egg White with 0.87% Guar | 4½ | 0.123 |

Table 7 illustrates the surprising reduction in whipping time as a result of co-drying egg white and guar gum as compared with dried egg white without guar gum. The angel cakes baked with co-dried egg white containing guar gum exhibited structure, texture and apparent moistness characteristics far superior to the cakes prepared from the reconstituted egg white without guar.

EXAMPLE VIII

Three samples of angel cake batter were prepared from frozen egg white containing guar gum, TEC and no additive in the following manner. Four pounds of frozen egg white were allowed to thaw at room temperature and were mixed at a slow speed when the temperature reached 40° F. while one ounce of salt and one ounce of cream of tartar were added. After one minute of mixing, two pounds of granulated sugar were added. The mixtures in these three samples were whipped to stiff peaks. Whip times were recorded and specific gravities were measured and noted. Twenty-two ounces of flour in three equal parts were then mixed into the samples. Each sample was scaled at 22 ounces, placed in tins and baked. The data are shown in Table 8.

TABLE 8.—EFFECT OF GUAR GUM IN FROZEN EGG WHITE ON ANGEL CAKE BATTER WHIP TIME

| Sample Egg White Description | White Time Minutes | Specific Gravity |
|---|---|---|
| Raw Frozen Control (plain) | 14 | 0.168 |
| .023 TEC | 8 | 0.165 |
| 0.1% Guar Gum and 5% Water | 7 | 0.166 |

Table 8 illustrates the reduced whip time required for the frozen angel cake batter with the egg white sample containing guar gum. All of the angel cakes baked from this test were not uniform. The cakes containing guar gum exhibited superior structure, texture and apparent moistness. These cakes had superior eating qualities. They were more tender and had longer shelf life.

EXAMPLE IX

In the conventional practice of commercially preparing angel food cakes from egg white solids, ice is used to reduce the temperature of the batter in order to increase its viscosity to prevent excessive loss from splashing during reconstitution and whipping. The addition of ice to standard sodium lauryl sulphate angel albumen is necessary to prevent excessive splashing and to reduce the formation of coarse open grained texture in the finished product. To determine the effect of egg white containing guar gum upon the method of commercially preparing angel cakes and upon the final commercial product, the following procedure was devised.

Two samples, each containing the following ingredients were prepared.

| Ingredients | Sample 1 | Sample 2 |
|---|---|---|
| Egg Solids | 8 oz. (with guar gum) | 8 oz. (with S.L.S.) |
| Water 70° F | 3 lb., 8 oz | 3 lb., 8 oz |
| Salt | 1 oz | 1 oz. |
| Cream of tartar | 1 oz | 1 oz. |
| Sugar | 2 lb | 2 lb. |
| Flour | 1 lb., 6 oz | 1 lb., 6 oz. |

The water, egg white solids, salt and cream of tartar were placed in the mixing bowl of a 40 quart commercial mixer. The mixture was stirred slowly during reconstitution for two minutes at low speed. For 45 seconds, the mixture was whipped at high speed and the sugar was added. Whipping continued until stiff peaks were formed. The whip times were recorded and foam specific gravities were measured and noted. The flour was mixed by hand and the batter was placed in ungreased angel food cake tins and baked for 32 minutes at a temperature of 360° F. The cakes were cooled, removed from the pans and examined for general characteristics of crust color, structure, texture, apparent moistness, and tenderness. The cakes prepared from standard angel type albumen containing 0.1% S.L.S. exhibited an open coarse grained texture. During the mixing process the lower viscosity of the batter containing the standard albumen splashed excessively, causing substantial loss of liquid. The cakes prepared with egg white containing guar gum had a close fine grained texture, improved apparent moistness and superior crust color, structure and tenderness.

During the mixing and whipping steps of the guar gum sample (Sample 1), no losses due to splashing were encountered.

Example X

A procedure was devised to determine the performance of guar gum egg white in the production of household angel food cake. Four dry mixes designated $A_1$, $A_2$, $A_3$ and B were obtained from various producers of household angel food dry cake mixes or they were prepared by me. In addition to egg white solids, phosphates and cream of tartar, the $A_1$ mix contained 0.87% guar gum, the $A_2$ mix contained S.L.S. and the $A_3$ mix contained no egg white additive. The B mix combined in each instance with $A_1$, $A_2$, and $A_3$ contained flour and vanilla. Three separate batches of angel cake batter were prepared from ingredients as shown below.

| Batch 1 | Batch 2 | Batch 3 |
|---|---|---|
| 320 grams water. | 320 grams water. | 320 grams water. |
| 210 grams $A_1$ mix. | 210 grams $A_2$ mix. | 210 grams $A_3$ mix. |
| 217 grams B mix. | 217 grams B mix. | 217 grams B mix. |

Water and the various "A" mixes were stirred slowly at low speed on a kitchen type Sunbeam Mixmaster for one minute. The mixer was then turned to high speed until the meringues held stiff peaks. The high speed whip time was recorded and the foam specific gravities were measured and recorded. The B mix was then added to each batch during low speed mixing for 1 minute, 15 seconds. Each of the batters were then poured into ungreased angel food cake pans and baked for 35 minutes at a temperature of 370° F. After baking, the cakes were allowed to cool before removal from the pans for test examination and comparison of structure, texture, crust color, apparent moistness, tenderness and shelf life.

The angel cakes produced from Batch 1 whipped more rapidly than those from Batch 3, and the cakes from Batch 1 were superior in eating qualities (tenderness), apparent moisture, ligher crust color and longer shelf life.

Example XI

To determine the effect of egg white containing guar gum in the preparation of icings, the following procedure was devised and followed. Liquid, dry blended, and co-dried egg white and guar gum samples were used in the preparation of household frosting mixes. Solid egg white samples containing various levels of guar gum were prepared and added to separate egg-less frosting pre-mixes. A control sample was prepared. It contained solid egg white with 7.5% by weight dry basis of carboxymethyl cellulose and 0.1% S.L.S. in accordance with commercial practice. Water was added to each of the samples and the slurries were whipped until stiff peaks were formed. The specific gravities were measured and noted and the whip times were recorded. The icings were used on layer cakes. After 36 hours, the icings were examined and compared. Table 11 portrays the data obtained.

TABLE 11.—THE EFFECT OF GUAR GUM ON ICINGS

| Sample No. | Egg White Sample Description | Whip Time Minutes | Specific Gravity |
|---|---|---|---|
| 1 | Control, 7½% CMC and 0.1% S.L.S. | 5 | 0.301 |
| 2 | 0.5% Guar Gum | 3½ | 0.301 |
| 3 | 0.8% Guar Gum | 3½ | 0.259 |
| 4 | 2.0% Guar Gum | 3½ | 0.257 |
| 5 | 4.0% Guar Gum | 3½ | 0.257 |

Table 11 illustrates the reduction in whip time imparted to the icing mixture when guar gum is used. Moreover, the samples containing guar gum produced a substantially greater volume of icing which was more moist and had a longer shelf life than the control sample.

While in the foregoing specification this invention has been described in relation to preferred embodiments thereof, and many details have been set forth for the purpose of illustration, it will be apparent to those skilled in the art that the invention is susceptible to other embodiments and that many of the details set forth herein can be varied considerably without departing from the basic principles of the invention.

I claim:

1. A composition consisting essentially of egg white and powdered guar gum in an amount sufficient to reduce the whipping time of said egg white.

2. A composition consisting essentially of spray dried egg white and powdered guar gum, said powdered guar gum dispersed throughout the spray dried egg white in an amount sufficient to reduce the whipping time of said egg white.

3. A solid composition consisting essentially of a mixture of co-dried egg white and guar gum, in an amount sufficient to reduce the whipping time of said egg white.

4. A composition consisting essentially of liquid natural egg white containing solids ranging from 11.8% to 12.2% by weight and powdered guar gum ranging from about 0.02% to 0.70% by weight.

5. A composition consisting essentially of liquid natural egg white and powdered guar gum, said powdered guar gum in amounts ranging from a trace to 10% by weight.

6. A composition consisting essentially of liquid natural egg white, water and guar gum, said water in amounts ranging from 0–90% by weight and said guar gum in amounts ranging from a trace to 10% by weight.

7. A process for producing an improved egg white comprising the steps of adding guar gum to said egg white in an amount sufficient to reduce the whipping time of said egg white, and mixing said egg white and said guar gum to attain dispersion of the guar gum throughout the egg white matrix.

8. A process for producing an improved solid egg white comprising the steps of mixing powdered guar gum into liquid egg white in an amount sufficient to reduce the whipping time of said egg white and co-drying the mixture.

9. A proces for producing an improved solid egg white comprising the steps of adding powdered guar gum to spray dried egg white in an amount sufficient to reduce the whipping time of said egg white, mixing said egg white and guar gum to attain dispersion of said guar gum in said egg white.

10. In a process for producing a meringue wherein whipped egg white is employed as an essential ingredient, the step comprised of adding guar gum to said egg white before being whipped and in an amount sufficient to reduce the whipping time of said egg white.

11. In a process for producing an angel cake wherein whipped egg white is employed as an essential ingredient, the step comprised of adding guar gum to said egg white before being whipped and in an amount sufficient to reduce the whipping time of said egg white.

12. In a process for producing an icing wherein whipped egg white is employed as an essential ingredient, the step comprised of adding guar gum to said egg white before being whipped and in an amount sufficient to reduce the whipping time of said egg white.

References Cited

UNITED STATES PATENTS

| | | | |
|---|---|---|---|
| 2,271,654 | 2/1942 | Littlefield | 99—139 |
| 2,929,715 | 3/1960 | Sutton | 99—114 X |
| 3,161,524 | 12/1964 | Opie et al. | 99—94 |
| 3,219,457 | 11/1965 | Ziegler et al. | 99—113 |
| 3,222,185 | 12/1965 | Yuch | 99—94 |
| 3,287,139 | 11/1966 | Ganz | 99—94 |

FOREIGN PATENTS 575,686  5/1959  Canada.

OTHER REFERENCES

Whistler et al.: Industrial Gums, page 328, 1959, Academic Press, New York.

RAYMOND N. JONES, *Primary Examiner.*

Notice of Adverse Decision in Interference

In Interference No. 96,680 involving Patent No. 3,378,376, M. Sebring, EGG WHITE COMPOSITION, METHOD OF PREPARING AND PROCESS UTILIZING SAME, final judgment adverse to the patentee was rendered Jan. 31, 1972, as to claims 1, 2, 3, 4, 5, 6, 7, 8, 9, 10 and 11.

[*Official Gazette July 4, 1972.*]